Dec. 10, 1963   H. C. WENDT   3,113,462
ANGULAR MOTION INDICATOR
Filed Feb. 26, 1962   4 Sheets-Sheet 1

INVENTOR
HARRY C. WENDT

BY
            ATTORNEY

AGENT

Dec. 10, 1963   H. C. WENDT   3,113,462
ANGULAR MOTION INDICATOR
Filed Feb. 26, 1962   4 Sheets-Sheet 3

United States Patent Office 3,113,462
Patented Dec. 10, 1963

3,113,462
ANGULAR MOTION INDICATOR
Harry C. Wendt, Lynnfield Center, Mass., assignor, by mesne assignments, to the United States of America as represented by the Secretary of the Navy
Filed Feb. 26, 1962, Ser. No. 175,856
4 Claims. (Cl. 73—503)

The present invention relates to a torque sensing and indicating mechanism and more particularly to a mechanism for providing an electrical signal indicative of the angular disturbances on the gimbals of a stabilized platform of a missile in flight.

An object of the present invention is to provide a mechanism for sensing angular disturbances to a missile.

Another object of the present invention is to provide a mechanism for generating a signal proportional to the differential of angular acceleration or instantaneous angular velocity of the angular disturbance to a missile.

A further object of the present invention is to provide a torque indicating mechanism for increasing the overall gain of a gimbal servo.

Another object of the present invention is to provide an improved transient torque response of a gimbal servo.

Still another object of the present invention is to provide an indicating mechanism as a feedback element for supplying a torque correction signal to a gimbal servo.

Other objects and many of the attendant advantages of this invention will be readily appreciated as the same becomes better understood by reference to the following detailed description when considered in connection with the accompanying drawings wherein.

Figure 1:
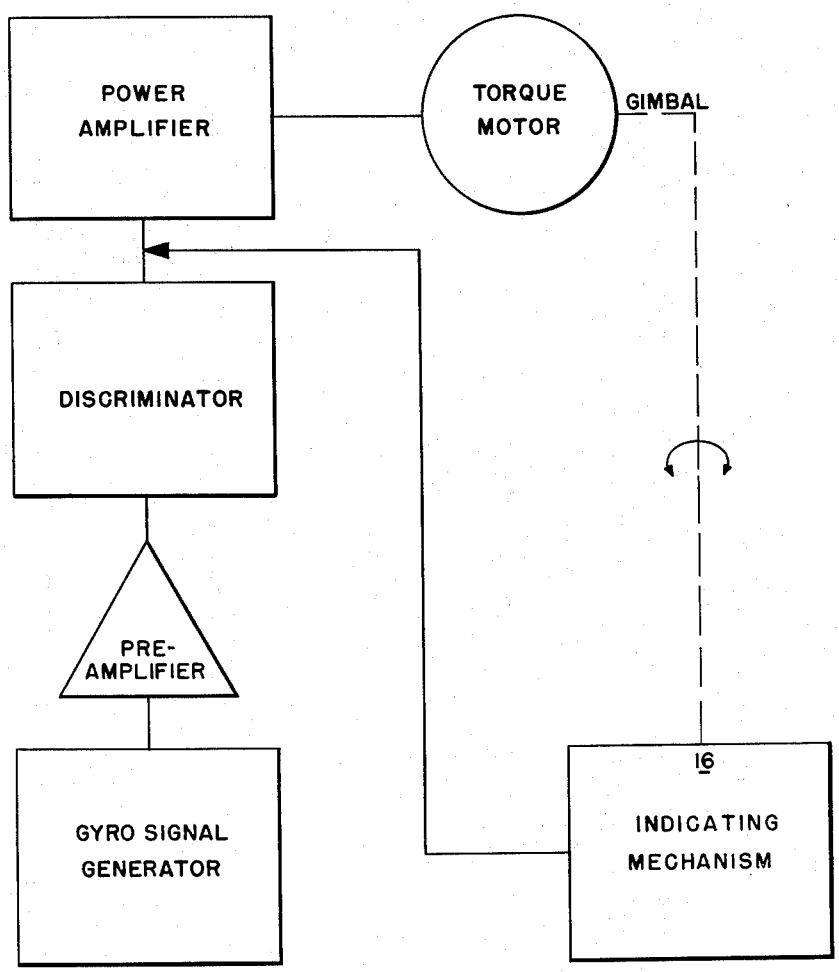
FIG. 1 is a schematic block diagram of a servo loop with the present invention as a feedback element.

Referring more particularly to the drawings, FIG. 1 shows a block diagram of a servo system with the indicating mechanism 16 of the present invention used as an angular differentiating accelerometer for sensing any angular disturbances on one of the gimbal axes of the stabilized element in the guidance system of a missile. Any disturbance to the gimbal moves the case of the indicating mechanism which sends immediately an electrical signal to the input of the power amplifier. The amplified signal of the power amplifier drives the torque motor to resist this disturbance thus the accelerometer minimizes servo error under external transitory torque disturbances. It is to be noted that an accelerometer is placed on each of the gimbal axes of the stabilized member in the guidance system with a servo loop for each gimbal axis.

Figure 2:
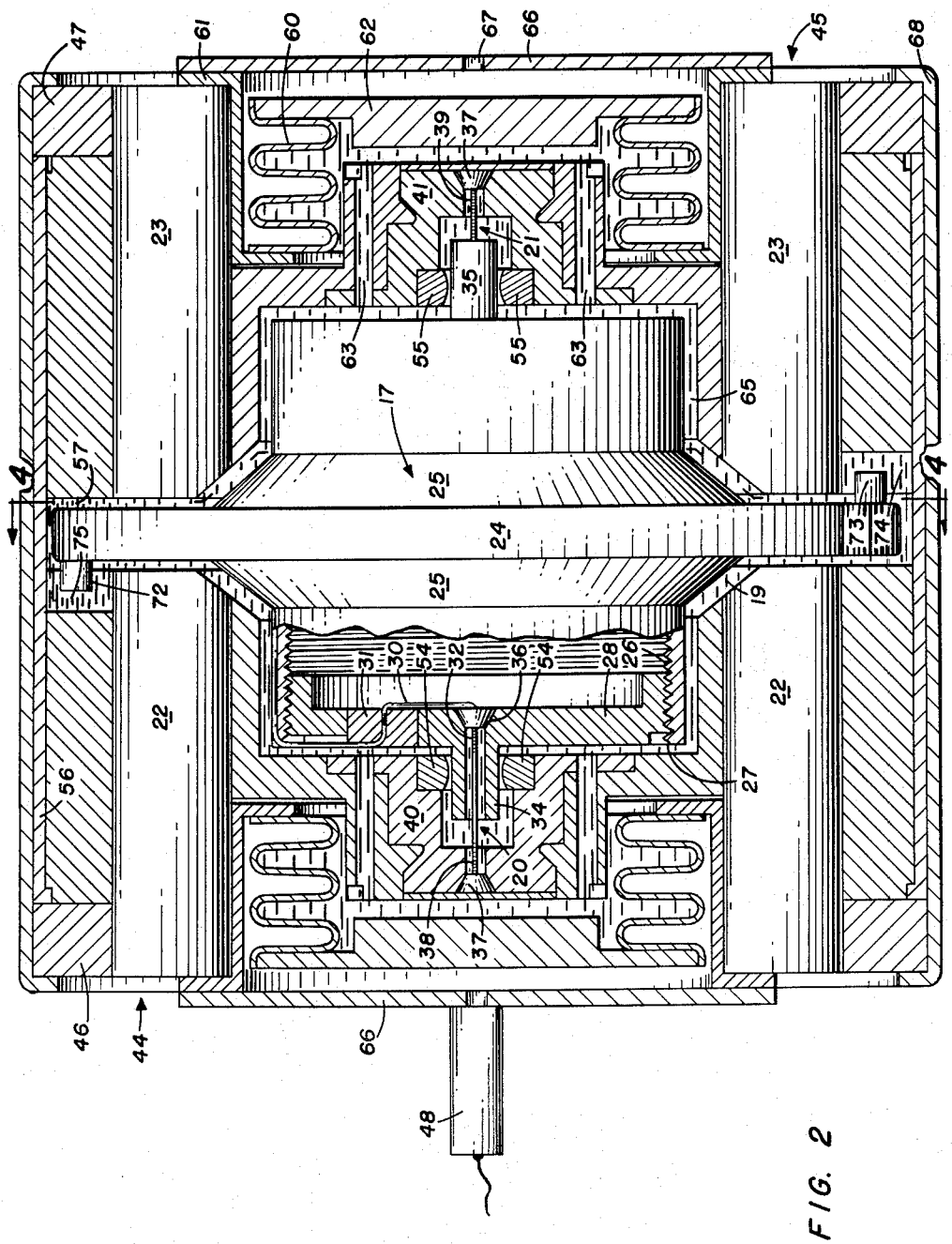
FIG. 2 shows an enlarged composite cross-sectional view of one embodiment of the indicating mechanism of the present invention.
Figure 4:
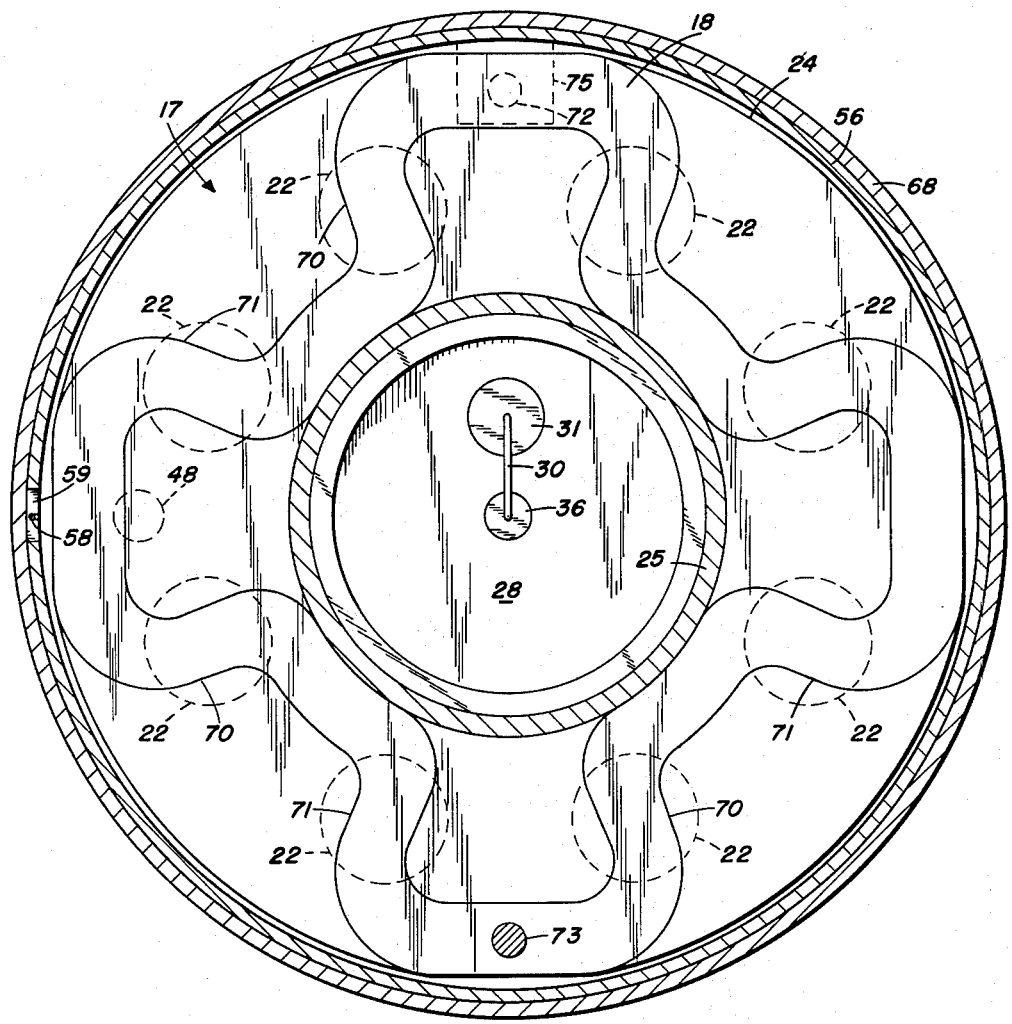
FIG. 4 shows a cross-sectional view of the mechanism taken on line 4—4 of FIG. 2.

Referring now to the detailed structure of the present invention of an indicating mechanism or angular differentiating accelerometer 16, FIG. 2 shows a rotor 17 with a cloverleaf shaped coil 18, more clearly indicated in FIG. 4, floated in a suitable fluid 19 suspended by two collinear torsion wires 20, 21 of rectangular cross section such that the rotation of the rotor about the axis of the torsion wires causes the coil of the rotor to move through magnetic fields of eight pairs of permanent magnets 22, 23.

The four-leaf coil 18 of the rotor 17 is cast into a form of a disk 24 around a float housing 25, the thickness of the disk being the same as that of the coil. Each end of the float housing is threaded as shown at 26. The float housing has open axial ends 27 in which float end caps 28 are threaded after the middle three or four threads at each housing end has been filled with an epoxy resin. With the rotor placed in a balancing fluid, the end caps are turned in and out as required to produce the condition where the float housing and disk will remain suspended and submerged with the torsion wire axis horizontal. This condition is met when the rotor displaces its own weight of fluid and is balanced along the torsion wire axis. Then the epoxy resin is set by baking and jumper wires 30 at each side of the rotor are soldered to the start and finish of the coil. The rotor is balanced around the torsion wire axis by immersing in the balancing fluid, noting the point of unbalance and filing away the metal sides of the float housing where required.

Each jumper wire 30 passes through openings 31 in the end caps 28 which are sealed with an epoxy resin. The other end of each jumper wire is soldered to the inner end of each torsion wire respectively. Each journal 34, 35 has a countersink 36 filled with epoxy resin for anchoring the torsion wires in the center thereof. The other or outer end 38, 39 of each torsion wire is soldered at 37 under tension to the anchor block 40, 41 of each stator assembly 44, 45.

Figure 3:
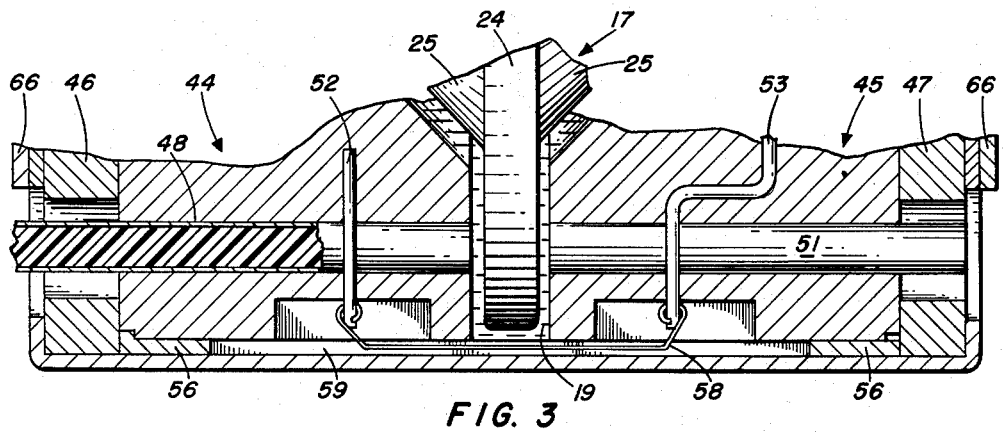
FIG. 3 is an exploded cross-sectional view of part of the electrical circuit of the invention.

The front and rear magnet stator assemblies 44 and 45, on opposite sides of the rotor, include anchor blocks 40 and 41, eight magnets 22 and 23, magnet back plates 46 and 47, two filler-tube terminal clips 48 for the front assembly and solid rods 51 for the rear assembly. Prior to casting each stator assembly, the magnets are pressed into each back plate, a short clip 52 is soldered to one filler-tube 48 in the front assembly, a formed clip 53 is soldered to a solid rod 51 and rear anchor block 41, and a second formed clip (not shown) is soldered to a second filler-tube and the front anchor block. Subsequent to casting of the stator assemblies, ring jewels 54, 55 are pressed into the anchor blocks to limit the lateral movement of the rotor. A spacer shell 56 separates the two magnet assemblies by a predetermined amount to provide a gap 57 in which the rotor can turn. After placing the assemblies in the shell 56, the connector wire 58 is soldered from short clip 52 to formed clip 53 spaced from the rotor in an opening 59 in the shell as shown in FIG. 3.

Figure 5:
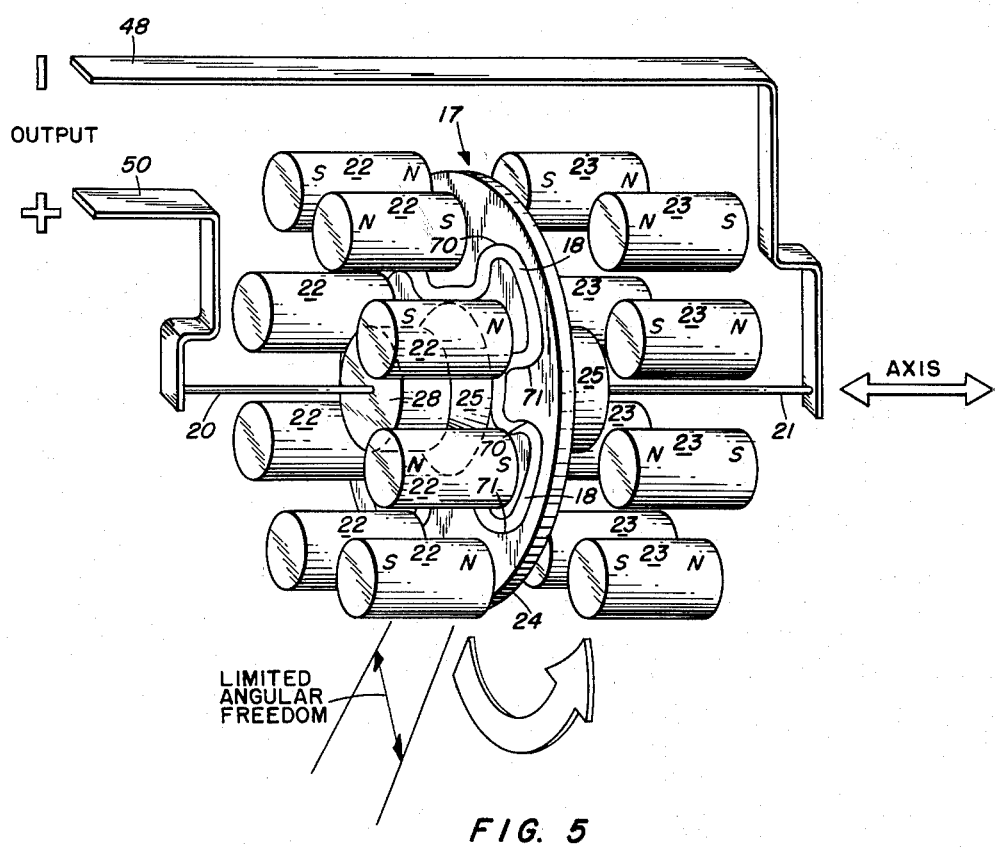
FIG. 5 is a fragmentary schematic perspective view of the present invention.

One end of a small bellows 60 is soldered to the inside bottom of a bellows cup 61. The other end of the bellows is soldered to a bellows cap 62. The bellows and cup assembly is epoxied into an opening in the back of each magnet assembly. Two channels 63 on each side of the rotor connect each bellows chamber 64 with the float chamber 65. A protective cover 66 with a small breather hole 67 in its center is secured over each bellows. The entire unit of the rotor, stator assemblies, and bellows is slipped into a cylindrical outer case 68. After evacuation, the unit is filled with a fluorocarbon oil 19 through filler-tube 48, which are subsequently pinched off, sealed by soldering and used as output terminals 48, 50 as shown in FIG. 5 of the mechanism. The bellows are used to control the expansion of the oil upon variation in temperature and to prevent any air from entering the oil.

The path of the electric circuit to the coil of the rotor is from one filler-tube 48 through short clip 52, connector wire 58, clip 53, rear anchor block 41, rear torsion wire 21, and rear jumper wire (not shown) to the coil winding 18. The return path is from the other end of the coil winding through front jumper wire 30, front torsion wire 20, front anchor block 40, a second formed clip (not shown) to a second filler-tube (not shown).

As shown in FIG. 5, each successive pair of magnets 22, 23 around the torsion wire axis has a magnetic field reversed of the pair which immediately precedes it and follows it. When the rotor rotates about the torsion wire axis or the case holding the stator assemblies moves relative to the rotor, a voltage is induced in each side 70, 71 of each leaf of the four-leaf clover shaped coil 18. Since the magnetic fields are reversed between each successive pairs of magnets the voltages induced in the eight sides of four leaves add. To keep the sides of the leaves from moving out of the magnetic field of the proper pair of magnets and into the field of an adjacent pair which would reverse the polarity of the induced voltage, a pair of stop pins 72, 73 are molded 180° apart on opposite faces of the rotor and engage with slots 74, 75 in the stator assemblies to limit the motion of the rotor.

At angular oscillation frequencies below 7 radians per second being the natural frequency of the rotor, the mechanism behaves as an angular differentiating accelerometer whose output is proportional to the derivative of angular acceleration. The response of the mechanism above the natural frequency of the rotor is such that the output signal is proportional to the instantaneous angular velocity.

With the present invention of the indicating mechanism placed in the gimbal servo loop as a feedback element, the torque gain has been verified as remaining constant regardless of the frequency of the torque input. In addition, the mechanism under transient torque response exhibits no overshoot as a step torque is applied but immediately assumes the required static value of error.

The indicating mechanism is very small being 0.75 in. in diameter by 0.75 in. in length and is easily mounted on the gimbals of the guidance package.

Obviously many modifications and variations of the present invention are possible in the light of the above teachings. It is therefore to be understood that within the scope of the appended claims the invention may be practiced otherwise than as specifically described.

What is claimed is:
1. Apparatus for providing an electrical signal indicative of the instantaneous angular velocity of a body, comprising:
   a stator having a plurality of pairs of circumferentially equally spaced permanent magnets of alternate polarity, and having a flotation chamber with a liquid therein;
   a rotor having a generally clover-leaf shaped coil with a plurality of sides equal in number to and associated with said plurality of pairs of magnets, said coil being cast into a disc-shaped form, and said coil and said form being disposed in a float housing of opened-end cylindrical shape, and end caps with small apertures therein and adapted to be received into the opened ends of said housing;
   means providing a path for transmitting said electrical signal, said means including, torsion wires for suspending said rotor in said liquid in a position such that each one of said plurality of sides of said coil cuts the flux path developed by each of said associated pair of said plurality of magnets, and lead wires connecting said coil to said torsion wires, which wires pass through the apertures in said end caps.

2. The apparatus of claim 1 wherein said torsion wires are of rectangular cross-section.

3. The apparatus of claim 2 wherein said end caps are adjustably received into the opened end of said housing.

4. The apparatus of claim 3 wherein said float chamber includes means for compensation for volumetric changes of said liquid and for prevnting the entry of foreign matter into said chamber.

References Cited in the file of this patent

UNITED STATES PATENTS

| 290,199 | Ball | Dec. 18, 1883 |
| 302,319 | Brush | July 22, 1884 |
| 2,671,202 | Petroff | Mar. 2, 1954 |
| 2,898,538 | Rafferty | Aug. 4, 1959 |
| 2,970,238 | Swiggett | Jan. 31, 1961 |
| 2,987,273 | Wanamaker | June 6, 1961 |
| 3,044,305 | Canfield | July 17, 1962 |

FOREIGN PATENTS

| 630,650 | Great Britain | Oct. 18, 1949 |
| 713,550 | Great Britain | Aug. 11, 1954 |
| 1,246,994 | France | Oct. 17, 1960 |